United States Patent
Hirata et al.

(10) Patent No.: US 7,463,449 B2
(45) Date of Patent: Dec. 9, 2008

(54) MAGNETIC HEAD FOR PERPENDICULAR MAGNETIC RECORDING, HEAD GIMBAL ASSEMBLY, HEAD ARM ASSEMBLY AND MAGNETIC DISK DRIVE

(75) Inventors: Kei Hirata, Tokyo (JP); Atsushi Yamaguchi, Tokyo (JP); Tetsuya Roppongi, Tokyo (JP); Kiyoshi Noguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 462 days.

(21) Appl. No.: 11/266,289

(22) Filed: Nov. 4, 2005

(65) Prior Publication Data

US 2006/0098335 A1 May 11, 2006

(30) Foreign Application Priority Data

Nov. 10, 2004 (JP) ............................. 2004-325799

(51) Int. Cl.
*G11B 5/31* (2006.01)
*G11B 5/127* (2006.01)
(52) U.S. Cl. ............................. 360/125.03; 360/125.12
(58) Field of Classification Search ................................. 360/125.02–125.32
See application file for complete search history.

(56) References Cited

U.S. PATENT DOCUMENTS

| | | | |
|---|---|---|---|
| 4,242,710 A | | 12/1980 | Hempstead et al. |
| 5,432,645 A | * | 7/1995 | Terunuma et al. ...... 360/125.41 |
| 5,872,693 A | | 2/1999 | Yoda et al. |
| 6,198,597 B1 | | 3/2001 | Tateyama et al. |
| 7,245,454 B2 | * | 7/2007 | Aoki et al. ............... 360/125.1 |
| 2002/0155321 A1 | * | 10/2002 | Kawasaki et al. ........... 428/692 |
| 2004/0179297 A1 | * | 9/2004 | Kameda ...................... 360/126 |
| 2004/0184191 A1 | * | 9/2004 | Ichihara et al. ............. 360/126 |
| 2006/0092564 A1 | * | 5/2006 | Le ............................... 360/126 |
| 2007/0139817 A1 | * | 6/2007 | Hirata et al. ................. 360/126 |

FOREIGN PATENT DOCUMENTS

| JP | A 60-59509 | 4/1985 |
|---|---|---|
| JP | B 1-7401 | 2/1989 |

(Continued)

OTHER PUBLICATIONS (Author: K. Nakamoto et al.) "Single-Pole/TMR Heads for 100 Gb/in$^2$ Perpendicular Recording", Journal of The Magnetic Society of Japan, vol. 27 No. 3, pp. 124-128 (2003).

*Primary Examiner*—William J Klimowicz
(74) *Attorney, Agent, or Firm*—Oliff & Berridge, PLC

(57) ABSTRACT

A pole layer incorporate a track width defining and a wide portion. A material forming the pole layer is an alloy whose major elements are iron and nickel. In the alloy, where the proportions of iron and nickel with respect to the total of iron and nickel are indicated as (100−M) weight % and M weight %, respectively, M is greater than 0 and smaller than or equal to 10. The internal stress of the pole layer is a tensile stress. The magnetostriction constant of the material forming the pole layer is positive. Where the anisotropy field of the pole layer is Hk (A/m), the magnetostriction constant of the material forming the pole layer is $\lambda (\times 10^{-6})$, and the internal stress of the pole layer is $\sigma$ (MPa), the value of $Hk/(\lambda \times \sigma)$ is greater than 0.01 and smaller than 0.2.

9 Claims, 6 Drawing Sheets

FOREIGN PATENT DOCUMENTS

| | | |
|---|---|---|
| JP | A 7-14118 | 1/1995 |
| JP | A 7-141621 | 6/1995 |
| JP | A 8-241503 | 9/1996 |
| JP | A 11-161913 | 6/1999 |
| JP | A 11-328615 | 11/1999 |
| JP | A 2000-331310 | 11/2000 |
| JP | A 2003-296906 | 10/2003 |
| JP | A 2003-317212 | 11/2003 |

* cited by examiner

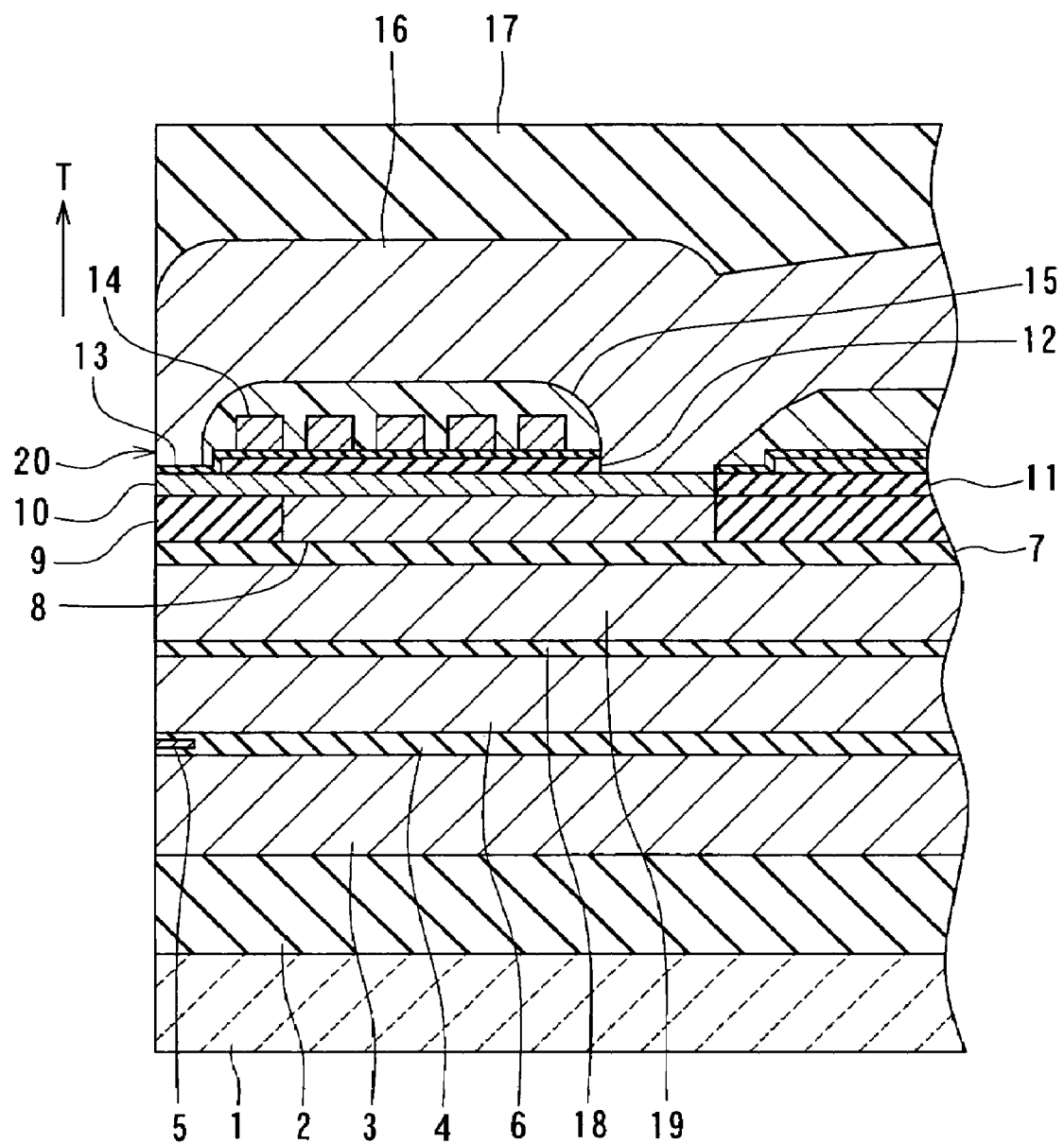
F I G. 1

MAGNETIC HEAD FOR PERPENDICULAR MAGNETIC RECORDING, HEAD GIMBAL ASSEMBLY, HEAD ARM ASSEMBLY AND MAGNETIC DISK DRIVE

BACKGROUND OF THE INVENTION

1. Field of the Invention

The present invention relates to a magnetic head for perpendicular magnetic recording that is used for writing data on a recording medium by using a perpendicular magnetic recording system and to a head gimbal assembly, a head arm assembly, and a magnetic disk drive each of which incorporates the magnetic head for perpendicular magnetic recording.

2. Description of the Related Art

The recording systems of magnetic read/write devices include a longitudinal magnetic recording system wherein signals are magnetized in the direction along the surface of the recording medium (the longitudinal direction) and a perpendicular magnetic recording system wherein signals are magnetized in the direction perpendicular to the surface of the recording medium. It is known that the perpendicular magnetic recording system is harder to be influenced by thermal fluctuation of the recording medium and capable of implementing higher linear recording density, compared with the longitudinal magnetic recording system.

A magnetic head for perpendicular magnetic recording comprises: a medium facing surface that faces toward a recording medium; a coil for generating a magnetic field corresponding to data to be written on the recording medium; and a pole layer allowing a magnetic flux corresponding to the field generated by the coil to pass therethrough, and generating a write magnetic field for writing the data on the recording medium through the use of a perpendicular magnetic recording system. The pole layer incorporates a track width defining portion and a wide portion, for example. The track width defining portion has an end located in the medium facing surface. The wide portion is coupled to the other end of the track width defining portion and has a width greater than the width of the track width defining portion. The track width defining portion has a nearly uniform width.

For the perpendicular magnetic recording system, it is an improvement in magnetic head and an improvement in recording medium that mainly contributes to a higher recording density. It is a reduction in track width, that is, a reduction in width of the end face of the pole layer located in the medium facing surface, and an improvement in writing performance that is particularly required for the magnetic head to achieve higher recording density. An improvement in writing performance is, for example, an improvement in overwrite property that is a parameter indicating an overwriting capability. The overwrite property deteriorates if the track width is reduced. Therefore, it is required to achieve a better overwrite property with a reduction in track width. To improve the overwrite property, it is effective to use a material having a high saturation flux density as the material of the pole layer.

It is an improvement in writing resolution that is required for the recording medium to achieve higher recording density. It is effective to increase the magnetic coercivity of the recording medium to improve the writing resolution. In this case, too, it is required to use a material having a high saturation flux density as the material of the pole layer so as to obtain a sufficient overwrite property when the recording medium having a great coercivity is used.

Against such a background, since it is impossible to obtain a sufficient saturation flux density through the use of a conventional FeNi alloy such as one having a composition of 18 weight % Fe and 82 weight % Ni or a composition of 50 weight % Fe and 50 weight % Ni, other materials having a high saturation flux density are considered for use as the material of the pole layer. To be specific, high saturation flux density materials such as an FeCo alloy, a CoNiFe alloy, FeC and FeN are considered for use as the material of the pole layer.

In a magnetic head for perpendicular magnetic recording, it is known that there is a phenomenon in which data stored on a recording medium is erased by a magnetic field produced by the pole layer due to residual magnetization of the pole layer when writing operation is not performed, which is hereinafter referred to as "pole erase phenomenon". It has been found that the pole erase phenomenon is likely to occur if the above-mentioned types of high saturation flux density materials are used as the material of the pole layer.

The likelihood of occurrence of the pole erase phenomenon depends on the shape of the track width defining portion of the pole layer. Japanese Published Patent Application (hereinafter referred to as "JP-A") 2003-296906 and JP-A 2003-317212 each disclose a technique for suppressing an occurrence of pole erase phenomenon by improving the design of the shape of the track width defining portion.

The likelihood of occurrence of the pole erase phenomenon also depends on the magnetic domain structure of the pole layer. The Journal of the Magnetic Society of Japan, vol. 27, No. 3, pp. 124-128, 2003 discloses a technique for suppressing an occurrence of pole erase phenomenon by reducing the throat height and thereby stabilizing the domain structure of the pole layer.

A variety of techniques have been proposed for stabilizing the domain structure of the pole layer by improving the shape of the pole layer and the structure around the pole layer of a magnetic head for longitudinal magnetic recording, as disclosed in JP-A 2000-331310, JP-A 11-161913 (1999), and JP-A 11-328615 (1999), for example.

JP-A 7-14118 (1995) discloses a technique for stabilizing the domain structure of the pole layer by improving the structure around the pole layer of a magnetic head for perpendicular magnetic recording.

Japanese Examined Patent Application Publication (hereinafter referred to as "JP-B") 1-7401 (1989) and JP-A 8-241503 (1996) each disclose a technique for controlling the domain structure of the pole layer by controlling the magnetostriction constant of a magnetic material forming the pole layer of a magnetic head for longitudinal magnetic recording. To be specific, JP-B 1-7401 discloses a technique for suppressing magnetic instability by using a NiFe alloy (81 to 84 weight % Ni and 19 to 16 weight % Fe) having a negative magnetostriction constant as a magnetic material forming the pole layer. JP-A 8-241503 discloses a technique for optimizing the magnetic domain structure of the pole layer by using a CoNiFe alloy (65 to 80 weight % Co, 15 to 25 weight % Ni and 8 to 25 weight % Fe) having a positive and great magnetostriction constant as a magnetic material forming the pole layer.

JP-A 60-59509 (1985) discloses a method of forming a thin film having an isotropic magnetic property that is used for a pole layer of a magnetic head for perpendicular magnetic recording. This publication discloses a Permalloy film having a composition of 78 weight % Ni and 22 weight % Fe as a specific example of the thin film.

As described above, each of JP-A 2003-296906 and JP-A 2003-317212 discloses the technique for suppressing an occurrence of pole erase phenomenon by controlling the shape of the track width defining portion. However, the shape of the track width defining portion has a great influence on the characteristics of the magnetic head. Therefore, there is a possibility that the characteristics of the magnetic head could be affected by designing the track width defining portion to have a special sort of shape to suppress an occurrence of pole erase phenomenon.

There is also a possibility that the characteristics of the magnetic head could be affected by modifying the shape of the pole layer or the structure around the pole layer to stabilize the domain structure of the pole layer as proposed in JP-A 2000-331310, JP-A 11-161913, JP-A 11-328615 and JP-A 7-14118.

Furthermore, a saturation flux density as high as one required for the pole layer of a magnetic head for perpendicular magnetic recording cannot be obtained through the use of the materials disclosed in JP-B 1-7401, JP-A 8-241503 and JP-A 60-59509.

Furthermore, it is unknown whether it is possible to suppress an occurrence of pole erase phenomenon through the use of the techniques disclosed in JP-A 11-161913, JP-A 11-328615, JP-A 7-14118, JP-B 1-7401, JP-A 8-241503 and JP-A 60-59509.

OBJECT AND SUMMARY OF THE INVENTION

It is an object of the invention to provide a magnetic head for perpendicular magnetic recording that is capable of improving a saturation flux density of a pole layer and suppressing an occurrence of pole erase phenomenon without imposing great limitations on the shape of the pole layer and the structure around the pole layer, and to provide a head gimbal assembly, a head arm assembly, and a magnetic disk drive each of which incorporates the magnetic head for perpendicular magnetic recording.

A magnetic head for perpendicular magnetic recording of the invention comprises: a medium facing surface that faces toward a recording medium; a coil for generating a magnetic field corresponding to data to be written on the recording medium; and a pole layer having an end face located in the medium facing surface, allowing a magnetic flux corresponding to the field generated by the coil to pass therethrough, and generating a write magnetic field for writing the data on the recording medium through the use of a perpendicular magnetic recording system.

In the magnetic head of the invention, a material forming the pole layer is an alloy whose major elements are iron and nickel. Where proportions of iron and nickel with respect to the total of iron and nickel are indicated as (100−M) weight % and M weight %, respectively, M is greater than 0 and smaller than or equal to 10.

In the magnetic head of the invention, the material forming the pole layer is the alloy having the above-mentioned composition. It is thereby possible to increase the saturation flux density of the pole layer and to suppress an occurrence of pole erase phenomenon without imposing great limitations on the shape of the pole layer and the structure around the pole layer.

In the magnetic head of the invention, an internal stress of the pole layer may be a tensile stress. The magnetostriction constant of the material forming the pole layer may be positive. Where an anisotropy field of the pole layer is Hk (A/m), the magnetostriction constant of the material forming the pole layer is $\lambda (\times 10^{-6})$, and the internal stress of the pole layer is $\sigma$ (MPa), the value of $Hk/(\lambda \times \sigma)$ may be greater than 0.01 and smaller than 0.2, Hk may be greater than 0 and smaller than or equal to 800, and $\sigma$ may be greater than or equal to 100 and smaller than or equal to 1000.

In the magnetic head of the invention, a coercivity of the pole layer in the direction of a hard axis may be 400 A/m or smaller.

In the magnetic head of the invention, the pole layer may have a saturation flux density of 1.8 T or greater.

In the magnetic head of the invention, the pole layer may incorporate: a track width defining portion having an end located in the medium facing surface; and a wide portion coupled to the other end of the track width defining portion and having a width greater than a width of the track width defining portion. In this case, a magnetic domain wall may be formed in the wide portion, the domain wall extending in the direction perpendicular to the medium facing surface and having an end located near the other end of the track width defining portion.

In the magnetic head of the invention, the pole layer may be disposed on a flat surface, and the pole layer may have a thickness that falls within a range of 0.15 to 0.4 µm inclusive.

A head gimbal assembly of the invention comprises: a slider including the magnetic head for perpendicular magnetic recording of the invention and disposed to face toward a recording medium; and a suspension flexibly supporting the slider.

A head arm assembly of the invention comprises: a slider including the magnetic head for perpendicular magnetic recording of the invention and disposed to face toward a recording medium; a suspension flexibly supporting the slider; and an arm for making the slider travel across tracks of the recording medium, the suspension being attached to the arm.

A magnetic disk drive of the invention comprises: a slider including the magnetic head for perpendicular magnetic recording of the invention and disposed to face toward a recording medium that is rotated and driven; and an alignment device supporting the slider and aligning the slider with respect to the recording medium.

According to the invention, the material forming the pole layer is the alloy whose major elements are iron and nickel, and, where proportions of iron and nickel with respect to the total of iron and nickel are indicated as (100−M) weight % and M weight %, respectively, M is greater than 0 and smaller than or equal to 10. As a result, according to the invention, it is possible to increase the saturation flux density of the pole layer and to suppress an occurrence of pole erase phenomenon without imposing great limitations on the shape of the pole layer and the structure around the pole layer.

In the invention, an internal stress of the pole layer may be a tensile stress. The magnetostriction constant of the material forming the pole layer may be positive. Where an anisotropy field of the pole layer is Hk (A/m), the magnetostriction constant of the material forming the pole layer is $\lambda (\times 10^{-6})$, and the internal stress of the pole layer is $\sigma$ (MPa), the value of $Hk/(\lambda \times \sigma)$ may be greater than 0.01 and smaller than 0.2, Hk may be greater than 0 and smaller than or equal to 800, and $\sigma$ may be greater than or equal to 100 and smaller than or equal to 1000. In this case, it is possible to suppress an occurrence of pole erase phenomenon with higher reliability.

In the invention, if a coercivity of the pole layer in the direction of the hard axis is 400 A/m or smaller, it is possible to suppress an occurrence of pole erase phenomenon with higher reliability.

In the invention, if the pole layer has a saturation flux density of 1.8 T or greater, it is possible to generate from the pole layer a magnetic flux sufficient for writing.

In the invention, it is possible to suppress an occurrence of pole erase phenomenon when the pole layer incorporates the track width defining portion and the wide portion, and a magnetic domain wall is formed in the wide portion, the domain wall extending in the direction perpendicular to the medium facing surface and having an end located near the other end of the track width defining portion.

In the magnetic head of the invention, if the pole layer is disposed on a flat surface and the pole layer has a thickness that falls within a range of 0.15 to 0.4 μm inclusive, it is possible to suppress an occurrence of pole erase phenomenon with higher reliability without reducing the track density.

Other and further objects, features and advantages of the invention will appear more fully from the following description.

BRIEF DESCRIPTION OF THE DRAWINGS

FIG. 1 is a cross-sectional view for illustrating the configuration of a magnetic head for perpendicular magnetic recording of an embodiment of the invention.

DETAILED DESCRIPTION OF THE PREFERRED EMBODIMENT

Figure 2:
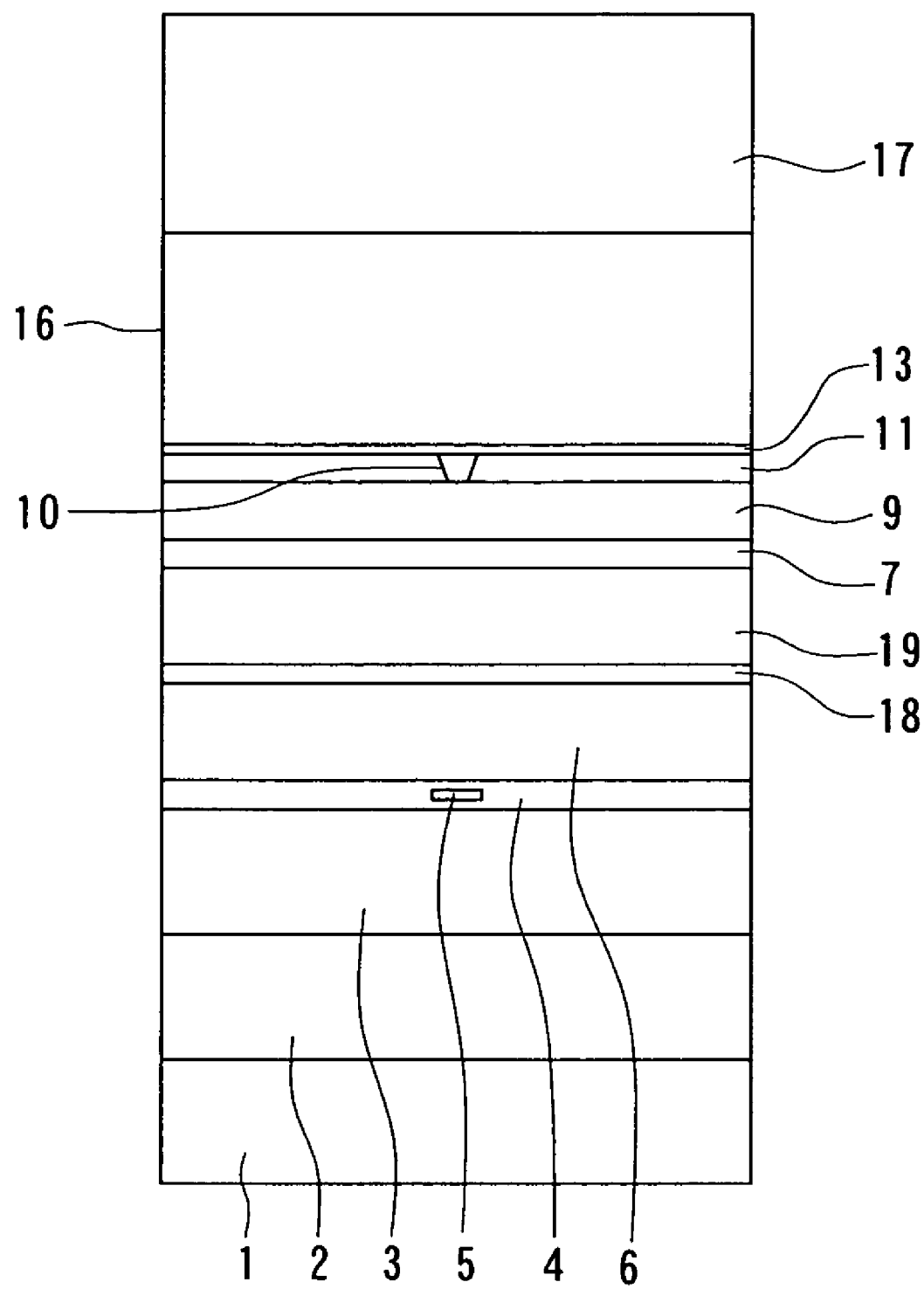
FIG. 2 is a front view of the medium facing surface of the magnetic head of FIG. 1.

A preferred embodiment of the invention will now be described in detail with reference to the accompanying drawings. Reference is now made to FIG. 1 and FIG. 2 to describe the configuration of a magnetic head for perpendicular magnetic recording of the embodiment of the invention. FIG. 1 is a cross-sectional view illustrating the configuration of the magnetic head of the embodiment. FIG. 1 shows a cross section perpendicular to the medium facing surface and a surface of a substrate. The arrow indicated with T in FIG. 1 shows the direction of rotation of a recording medium. FIG. 2 is a front view illustrating the medium facing surface of the magnetic head of the embodiment.

As shown in FIG. 1 and FIG. 2, the magnetic head for perpendicular magnetic recording (hereinafter simply called the magnetic head) of the embodiment comprises: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a bottom shield layer 3 made of a magnetic material and disposed on the insulating layer 2; a magnetoresistive (MR) element 5 as a read element disposed over the bottom shield layer 3 with an insulating layer 4 disposed between the MR element 5 and the bottom shield layer 3; and a top shield layer 6 made of a magnetic material and disposed over the MR element 5 with the insulating layer 4 disposed between the MR element 5 and the top shield layer 6.

The MR element 5 has an end that is located in a medium facing surface (an air bearing surface) 20 that faces toward a recording medium. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element.

The magnetic head further comprises: a nonmagnetic layer 18 made of a nonmagnetic material such as alumina and formed on the top shield layer 6; a magnetic layer 19 made of a magnetic material and formed on the nonmagnetic layer 18; a nonmagnetic layer 7 made of a nonmagnetic material such as alumina and formed on the magnetic layer 19; a yoke layer 8 made of a magnetic material and formed on the nonmagnetic layer 7; and a nonmagnetic layer 9 made of an insulating nonmagnetic material such as alumina and disposed around the yoke layer 8. An end of the yoke layer 8 closer to the medium facing surface 20 is located at a distance from the medium facing surface 20. The yoke layer 8 and the nonmagnetic layer 9 have flattened top surfaces.

The magnetic head further comprises: a pole layer 10 made of a magnetic material and disposed on the top surfaces of the yoke layer 8 and the nonmagnetic layer 9; and a nonmagnetic layer 11 made of an insulating nonmagnetic material such as alumina and disposed around the pole layer 10. A bottom surface of the pole layer 10 touches the top surface of the yoke layer 8. The pole layer 10 and the nonmagnetic layer 11 have flattened top surfaces.

The magnetic head further comprises: a nonmagnetic layer 12 made of an insulating nonmagnetic material such as alumina and formed on regions of the pole layer 10 and the nonmagnetic layer 11 where a thin-film coil 14 described later will be disposed; a gap layer 13 made of a nonmagnetic material such as alumina and formed to cover the nonmagnetic layer 12; the thin-film coil 14 disposed on the gap layer 13 and above the nonmagnetic layer 12; and an insulating layer 15 formed to cover the thin-film coil 14. The coil 14 is flat-spiral-shaped. The gap layer 13 has an opening located in a region corresponding to the center of the coil 14. The insulating layer 15 is not exposed from the medium facing surface 20. The gap layer 13 may be a nonmagnetic conductive layer.

The magnetic head further comprises: a write shield layer 16 made of a magnetic material and formed on the pole layer 10, the gap layer 13 and the insulating layer 15; and a protection layer 17 formed to cover the write shield layer 16. The write shield layer 16 is coupled to the pole layer 10 through the opening of the gap layer 13. An end of the write shield layer 16 closer to the medium facing surface 20 is located in the medium facing surface 20.

The magnetic head of the embodiment comprises the medium facing surface 20 that faces toward a recording medium as described so far, and a read head and a write head. The read head is disposed backward in the direction T of rotation of the recording medium (that is, disposed closer to the air inflow end of the slider). The write head is disposed forward in the direction T of rotation of the recording medium (that is, disposed closer to the air outflow end of the slider). The magnetic head writes data on the recording medium using the write head and reads data stored on the medium using the read head.

The read head comprises the MR element 5 as the read element, and the bottom shield layer 3 and the top shield layer 6 for shielding the MR element 5. Portions of the bottom shield layer 3 and the top shield layer 6 that are located on a side of the medium facing surface 20 are opposed to each other, the MR element 5 being placed between these portions. The read head further comprises the insulating layer 4 disposed between the MR element 5 and the bottom shield layer 3 and between the MR element 5 and the top shield layer 6.

The write head comprises the yoke layer 8, the pole layer 10, the gap layer 13, the thin-film coil 14, and the write shield layer 16. The thin-film coil 14 generates a magnetic field corresponding to data to be written on the recording medium. The pole layer 10 has an end face located in the medium facing surface 20. The pole layer 10 allows a magnetic flux corresponding to the field generated by the coil 14 to pass therethrough and generates a write magnetic field for writing data on the medium by using the perpendicular magnetic recording system. As shown in FIG. 2, the end face of the pole layer 10 located in the medium facing surface 20 has a shape of trapezoid whose side closer to the gap layer 13 is longer than the opposite side. It is thereby possible to suppress a phenomenon in which, when data is written on a track, data stored on an adjacent track is erased because of a skew. The skew is a tilt of the magnetic head with respect to the tangent of the circular track of a recording medium.

The write shield layer 16 has an end face located in the medium facing surface 20. In the medium facing surface 20, the end face of the write shield layer 16 is disposed forward of the end face of the pole layer 10 along the direction T of rotation of the recording medium (that is, disposed closer to the air outflow end of the slider than the end face of the pole layer 10 is) with a specific space created by the thickness of the gap layer 13. The thickness of the gap layer 13 falls within a range of 15 to 100 nm inclusive, for example. A portion of the write shield layer 16 located away from the medium facing surface 20 is magnetically coupled to the pole layer 10. The gap layer 13 is made of a nonmagnetic material and provided between the pole layer 10 and the write shield layer 16. At least a portion of the thin-film coil 14 is disposed between the pole layer 10 and the write shield layer 16 and insulated from the pole layer 10 and the write shield layer 16.

A variety of modifications of the magnetic head of the embodiment are possible, as will now be described. First, it is not always necessary to provide the yoke layer 8. Furthermore, in addition to the flat-spiral-shaped coil 14 of FIG. 1, another flat-spiral-shaped coil may be provided between the magnetic layer 19 and the pole layer 10 and insulated from the magnetic layer 19 and the pole layer 10. In this case, the magnetic layer 19 and the pole layer 10 may be connected to each other but it is not absolutely necessary that they are connected to each other. In place of the coil 14, a coil wound around the pole layer 10 in a helical manner may be provided. The write shield layer 16 may be made up of a single layer or a plurality of layers. The end face of the pole layer 10 located in the medium facing surface 20 may be rectangle-shaped. In place of the write shield layer 16, an auxiliary pole layer may be provided between the top shield layer 6 and the pole layer 10, and a thin-film coil may be provided between the auxiliary pole layer and the pole layer 10, in place of the thin-film coil 14. In this case, portions of the auxiliary pole layer and the pole layer 10 located away from the medium facing surface 20 are magnetically coupled to each other, and, in the medium facing surface 20, end faces of the auxiliary pole layer and the pole layer 10 are located away from each other with a nonmagnetic layer disposed in between.

Figure 3:
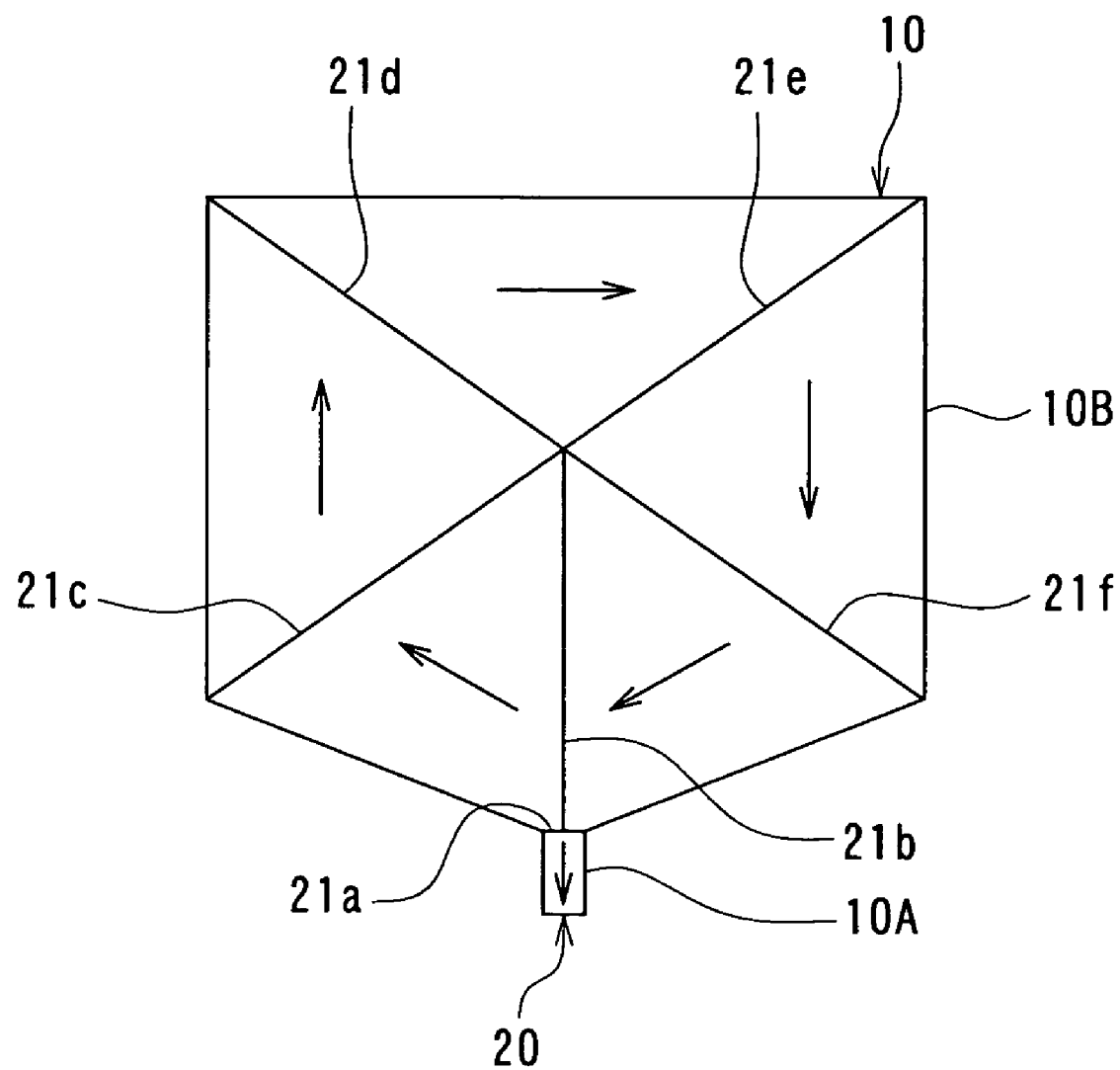
FIG. 3 is a top view of the pole layer of the magnetic head of FIG. 1.

Reference is now made to FIG. 3 to describe features of the pole layer 10 in detail. FIG. 3 is a top view of the pole layer 10. As shown in FIG. 3, the pole layer 10 incorporates a track width defining portion 10A and a wide portion 10B. The track width defining portion 10A has an end located in the medium facing surface 20. The wide portion 10B is coupled to the other end of the track width defining portion 10A and has a width greater than the width of the track width defining portion 10A. The top surface of the track width defining portion 10A has a nearly uniform width. The width of the top surface of the track width defining portion 10A taken in the medium facing surface 20 defines the track width. For example, the wide portion 10B is equal in width to the track width defining portion 10A at the interface with the track width defining portion 10A, and gradually increases in width as the distance from the medium facing surface 20 increases and then maintains a specific width to the end of the wide portion 10B. Here, the length of the track width defining portion 10A taken in the direction perpendicular to the medium facing surface 20 is called a neck height.

The width of the top surface of the track width defining portion 10A located in the medium facing surface 20, that is, the track width, is within a range of 0.08 to 0.30 μm inclusive, for example. The neck height falls within a range of 0.05 to 0.5 μm inclusive, for example. The maximum width of the wide portion 10B is within a range of 5 to 30 μm inclusive, for example. The pole layer 10 preferably has a thickness that is within a range of 0.15 to 0.4 μm inclusive.

FIG. 3 shows an example of magnetic domain structure of the pole layer 10. In FIG. 3, numerals 21a to 21f indicate domain walls, and arrows indicate directions of magnetization in the domains. As shown in FIG. 3, the domain wall 21b is formed in the wide portion 10B. The domain wall 21b has an end located near the other end of the track width defining portion 10A and extends in the direction perpendicular to the medium facing surface 20.

In the embodiment, the material forming the pole layer 10 is an alloy whose major elements are iron (Fe) and nickel (Ni). In this alloy, if the proportions of iron and nickel with respect to the total of iron and nickel are indicated as (100−M) weight % and M weight %, respectively, M is greater than 0 and smaller than or equal to 10. The material forming the pole layer 10 may contain a trace element other than iron and nickel. If the total of iron and nickel is 100 weight %, the proportion of the very small quantity of element is preferably 1.0 weight % or smaller, and more preferably 0.5 weight % or smaller. Such an element may be B, C, N, O, S or Cl, for example.

In the embodiment, the material forming the pole layer 10 is an alloy having the above-mentioned composition. As a result, it is possible to increase the saturation flux density of the pole layer 10 and to suppress an occurrence of pole erase phenomenon without imposing great limitations on the shape of the pole layer 10 and the structure around the pole layer 10, as results of experiments described later show.

For a magnetic disk drive, it is required that, where an overwrite property is indicated as −X dB, X is 30 or greater. If M that indicates the proportion of nickel contained in the material forming the pole layer 10 is greater than 10, the saturation flux density of the pole layer 10 is reduced and it is difficult to obtain X of 30 or greater. Therefore, the value of M is 10 or smaller in the embodiment.

In the embodiment, the internal stress of the pole layer 10 is a tensile stress and the magnetostriction constant of the material forming the pole layer 10 is positive. Where the anisotropy field of the pole layer 10 is Hk (A/m), the magnetostriction constant of the material forming the pole layer 10 is $\lambda(\times 10^{-6})$, and the internal stress of the pole layer 10 is σ (MPa), it is preferred that the value of Hk/(λ×σ) is greater than 0.01 and smaller than 0.2, Hk is greater than 0 and smaller than or equal to 800, and σ is greater than or equal to 100 and smaller than or equal to 1000. The meanings of these will be discussed in the following.

When the internal stress of the pole layer 10 is a tensile stress and the magnetostriction constant of the material forming the pole layer 10 is positive, magnetic anisotropy is generated due to an inverse magnetostrictive effect, which directs magnetization in the track width defining portion 10A to the direction parallel to the medium facing surface 20. It is thereby possible to suppress an occurrence of pole erase phenomenon.

The range of the value of Hk/(λ×σ) will now be described. If the value of Hk/(λ×σ) is 0.01 or smaller, a magnetoelasticity effect increases and the magnetic domain structure of the wide portion 10B is made unstable. As a result, a pole erase phenomenon is likely to occur. Therefore, it is preferred that the value of Hk/(λ×σ) is greater than 0.01. The requirement that the value of Hk/(λ×σ) is smaller than 0.2 is derived from the experiment result described later.

Next, the relationship among Hk, the domain wall 21b and the pole erase phenomenon will be described, then the range of Hk will be described. As shown in FIG. 3, if Hk is small, in the pole layer 10 incorporating the track width defining portion 10A and the wide portion 10B, the track width defining portion 10A is a pinning site and it is likely that the domain wall 21b extending in the direction perpendicular to the medium facing surface 20 is created. Conversely, if Hk is great, it is unlikely that the domain wall 21b is created. Next, if the domain wall 21b is created, it is assumed that a change in direction of magnetization in the pole layer 10 when writing is performed is carried out in a domain wall displacement mode, not in a rotational magnetization mode. In this case, if the domain wall displacement made in response to the magnetic field generated by the coil 14 is poor, a magnetic flux is generated from the end face of the track width defining portion 10A closer to the medium facing surface 20 even after writing operation. As a result, it is considered that the pole erase phenomenon is likely to occur.

Thus, if Hk is great, it is considered that it is unlikely that the domain wall 21b is created, and it is therefore unlikely that the pole erase phenomenon occurs. However, if Hk is great, the responsivity of a change in direction of magnetization in the pole layer 10 in response to the magnetic field generated by the coil 14 is made poor, which is not suitable for high density recording. On the other hand, if Hk is small, it is likely that the domain wall 21b is created. In the embodiment, Hk is greater than 0 and smaller than or equal to 800, and creation of the domain wall 21b is thereby allowed. Instead, an occurrence of pole erase phenomenon is suppressed by increasing the responsivity of domain wall displacement in response to the field generated by the coil 14, in addition to generation of magnetic anisotropy based on the inverse magnetostrictive effect as described above. Therefore, the requirement that Hk is greater than 0 and smaller than or equal to 800 means that creation of the domain wall 21b is allowed.

The range of σ will now be described. If σ is smaller than 100, the above-mentioned effect of suppressing the pole erase phenomenon by magnetic anisotropy based on the inverse magnetostrictive effect is reduced, and it is likely that the pole erase phenomenon occurs. On the other hand, if σ is greater than 1000, a possibility that the pole layer 10 is separated from the underlayer after the layer 10 is formed increases. Therefore, it is preferred that σ is greater than or equal to 100 and smaller than or equal to 1000.

Hk and σ depend on not only the composition of the material forming the pole layer 10 but also the conditions for forming the pole layer 10. In contrast, λ is almost solely determined by the composition of the material forming the pole layer 10. In the embodiment, the composition of the material forming the pole layer 10 is defined, which determines the value of λ. Therefore, the range of λ is not defined.

In the embodiment, as the experiment result described later shows, the alloy having the previously described composition is used as the material forming the pole layer 10, and the pole layer 10 is formed such that Hk, λ and σ satisfy the above-mentioned conditions. It is thereby possible to suppress an occurrence of pole erase phenomenon even if the domain wall 21b is created in the wide portion 10B.

In the embodiment, if the coercivity of the pole layer 10 in the direction of hard axis is greater than 400 A/m, the responsivity of domain wall displacement in response to the field generated by the coil 14 is made poor, and the pole erase phenomenon is likely to occur. It is therefore preferred that the coercivity of the pole layer 10 in the direction of hard axis is 400 A/m or smaller. It is thereby possible to suppress an occurrence of pole erase phenomenon with good reliability. The direction of hard axis of the pole layer 10 is the direction parallel to the medium facing surface 20.

In the embodiment, if the saturation flux density of the pole layer 10 is smaller than 1.8 T, it is difficult to generate from the pole layer 10 a magnetic flux sufficient to make a saturation recording, and there is a possibility that the writing capability is made insufficient. Therefore, it is preferred that the saturation flux density of the pole layer 10 is 1.8 T or greater. It is thereby possible to generate from the pole layer 10 a magnetic flux sufficient for writing.

In the embodiment, the pole layer 10 is disposed on the flat surfaces (the top surfaces of the yoke layer 8 and the nonmagnetic layer 9). The pole layer 10 preferably has a thickness that is greater than or equal to 0.15 μm and smaller than or equal to 0.4 μm. The reason will now be described. If the thickness of the pole layer 10 is smaller than 0.15 μm, the domain structure of the pole layer 10 tends to be an island domain structure or a single domain structure. It is thereby likely that the pole erase phenomenon occurs. On the other hand, if the thickness of the pole layer 10 is greater than 0.4 μm, when data is written on a specific track, the widths of regions in which data is erased on both sides of the specific track are made too great, and the track density is thereby reduced. Furthermore, if the pole layer 10 is not disposed on a flat surface, asperities are created in the pole layer 10, and there is a possibility that an unstable domain structure may be formed in the pole layer 10. Because of these reasons, it is preferred that the pole layer 10 is disposed on a flat surface and the pole layer 10 has a thickness that is greater than or equal to 0.15 μm and smaller than or equal to 0.4 μm. It is thereby possible to suppress an occurrence of pole erase phenomenon with good reliability without reducing the track density.

Figure 8:
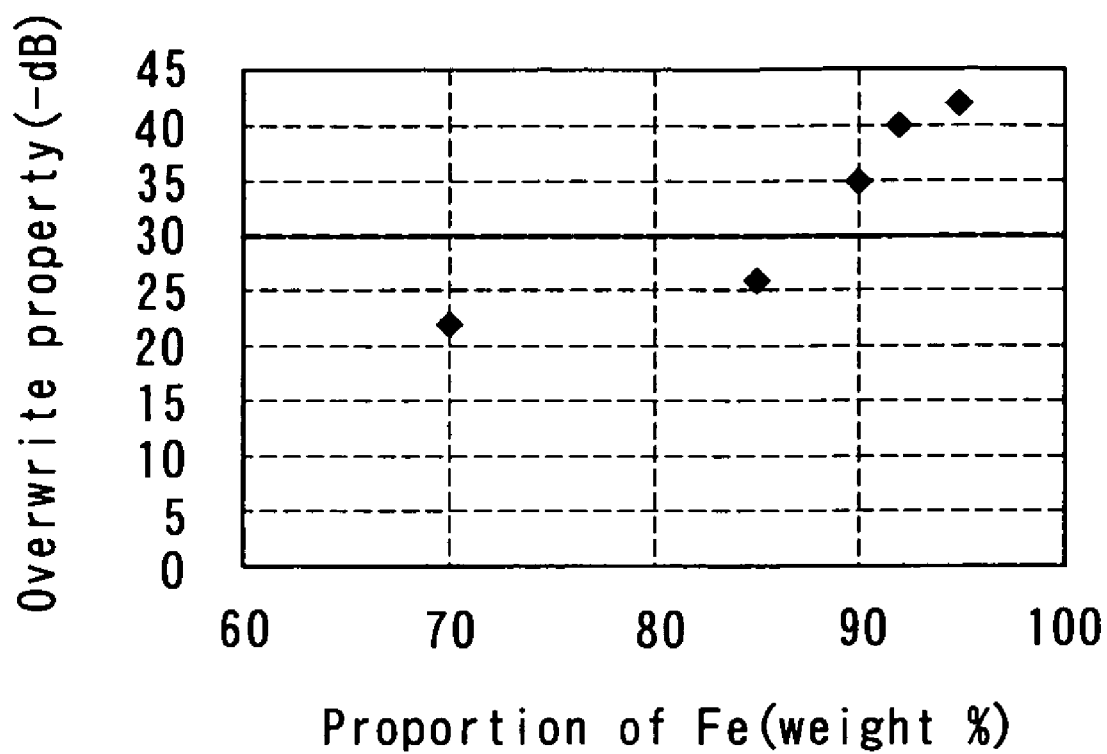
FIG. 8 is a plot showing a result of an experiment performed for confirming an effect of the magnetic head of the embodiment of the invention.

The results of the first and second experiments performed for confirming the effects of the magnetic head of the embodiment will now be described. In the first experiment, the relationship between the composition of the material forming the pole layer 10 and the overwrite property of the magnetic head was obtained. In the experiment, the overwrite property was obtained for each of five samples of the magnetic head wherein the materials forming the pole layers 10 had different compositions. In the five samples, the materials forming the pole layers 10 were all alloys made up of Fe and Ni, but the proportions of Fe with respect to the total of Fe and Ni were all different and 70 weight %, 85 weight %, 90 weight %, 92 weight %, and 95 weight %, respectively. FIG. 8 shows the result of the first experiment. In FIG. 8, the horizontal axis indicates the proportion of Fe in the material forming the pole layer 10, and the vertical axis indicates the overwrite property. For a magnetic disk drive, it is required that, where the overwrite property is indicated as −X dB, X is 30 or greater. As shown in FIG. 8, if the proportion of Fe is 90 weight % or greater, X is 30 or greater. However, if the proportion of Fe is smaller than 90 weight %, there is a possibility that X is smaller than 30. This result of the experiment indicates that, for the material forming the pole layer 10, where the proportions of Fe and Ni with respect to the total of Fe and Ni are (100−M) weight % and M weight %, respectively, it is preferred that M is greater than 0 and smaller than or equal to 10.

The second experiment will now be described. In the experiment, the occurrence of pole erase phenomenon was examined for samples of the magnetic head prepared as examples 1 to 4 of the embodiment and references 1 to 3. A table below shows compositions of the materials forming the pole layers 10, fabrication methods of the pole layers 10, and thicknesses of the pole layers 10. Each of the materials forming the pole layers 10 of the examples 1 to 4 and the references 1 and 2 was an FeNi alloy. The material forming the pole layer 10 of the reference 3 was an FeCoZrO alloy.

TABLE 1

| Samples | Composition of material of pole layer | Fabrication method | Pole layer thickness |
|---|---|---|---|
| Example 1 | 95 weight % Fe and 5 weight % Ni | Plating | 250 nm |
| Example 2 | 91 weight % Fe and 9 weight % Ni | Plating | 240 nm |
| Example 3 | 95 weight % Fe and 5 weight % Ni | Sputtering | 250 nm |
| Example 4 | 92 weight % Fe and 8 weight % Ni | Sputtering | 260 nm |
| Reference 1 | 91 weight % Fe and 9 weight % Ni | Plating | 147 nm |
| Reference 2 | 95 weight % Fe and 5 weight % Ni | Sputtering | 220 nm |
| Reference 3 | 95 weight % FeCo (75 weight % Fe and 25 weight % Co) and 5 weight % $ZrO_2$ | Sputtering | 290 nm |

The pole layers 10 of the examples 1 and 2 and the reference 1 were fabricated by electroplating, using plating bathing of compositions shown in the table below. The plating bath temperature was 20° C. In the experiment, a plurality of types of pole layers 10 having different compositions of the materials or having different characteristics such as internal stresses were fabricated by changing the pH of the plating bath and the plating current value.

TABLE 2

| | |
|---|---|
| Nickel sulfate hexahydrate | 40 g/L |
| Iron sulfate heptahydrate | 63 g/L |
| Boric acid | 25 g/L |
| Sodium chloride | 25 g/L |
| Saccharin sodium | 0.5 g/L |
| Sodium lauryl sulfate | 0.01 g/L |

The pole layers 10 of the examples 3 and 4 and the reference 2 were fabricated by sputtering in a nonmagnetic field under the conditions shown in a table below. The target used was one in which a chip made of Ni is attached to top of a target material made of Fe.

TABLE 3

| | |
|---|---|
| Sputter power | 1000 W |
| Bias power | 0 W |
| Ar gas pressure | 0.05 Pa |
| Film forming temperature | Room temperature |
| Substrate rotation rate | 20 rpm |

The pole layer 10 of the reference 3 was fabricated by sputtering under the conditions shown in a table below.

TABLE 4

| | |
|---|---|
| Sputter power | 1500 W |
| Bias power | 100 W |
| Ar gas pressure | 0.2 Pa |
| Partial pressure of oxygen | 0.05 Pa |
| Film forming temperature | Room temperature |
| Substrate rotation rate | 20 rpm |

A table below shows characteristics of the samples fabricated as thus described. In the table, Bs (T) indicates the saturation flux density of the pole layer 10, Hc (A/m) indicates the coercivity in the direction of hard axis of the pole layer 10, Hk (A/m) indicates the anisotropy field of the pole layer 10, $\lambda(\times 10^{-6})$ indicates the magnetostriction constant of the material forming the pole layer 10, and σ (MPa) indicates the internal stress of the pole layer 10. The magnetic characteristics of the samples were measured with a vibrating sample magnetometer.

TABLE 5

| Samples | Bs (T) | Hc (A/m) | Hk (A/m) | $\lambda (\times 10^{-6})$ | σ (MPa) | Hk/(λ × σ) |
|---|---|---|---|---|---|---|
| Example 1 | 2.1 | 2.2 × 79.6 | 301 | 1.9 | 890 | 0.1780 |
| Example 2 | 1.9 | 4.8 × 79.6 | 399 | 2.1 | 952 | 0.1996 |
| Example 3 | 1.9 | 3.2 × 79.6 | 8 | 2.1 | 206 | 0.0184 |
| Example 4 | 2.0 | 4.4 × 79.6 | 85 | 2.1 | 210 | 0.1927 |
| Reference 1 | 1.9 | 4.8 × 79.6 | 160 | 1.9 | 721 | 0.1165 |
| Reference 2 | 1.9 | 3.2 × 79.6 | 80 | 2.1 | 180 | 0.2111 |
| Reference 3 | 2.0 | 1.5 × 79.6 | 718 | 3.2 | 290 | 0.7739 |

The examples 1 to 4 of the embodiment satisfy all the preferred conditions of the above-described embodiment. For the reference 1, the thickness of the pole layer 10 is 147 nm (0.147 μm), which does not satisfy the preferred thickness of the pole layer 10 that is greater than or equal to 0.15 μm and smaller than or equal to 0.4 μm. For the references 2 and 3, the values of Hk/(λ×σ) are greater than 0.2, which does not satisfy the preferred condition of the value of Hk/(λ×σ) that is greater than 0.01 and smaller than 0.2.

Next, the occurrence of pole erase phenomenon was evaluated for each of the above-described samples by a method that will now be described. In this evaluation method, a medium for perpendicular magnetic recording having a coercivity of 3300×79.6 (A/m) was used as a recording medium in which one track was divided into 75 sectors. In the method of the experiment, a high frequency signal was once written on all the sectors of one track, and then the signal was read and an initial amplitude of the signal was measured. Next, a low frequency signal was written over a region at the head of each of the sectors, the region having a length one-thirtieth the length of the sector. The signal was then re-read and the amplitude of the high frequency signal was measured. This processing was repeated 100 times. When the processing was performed, data was erased by direct current erasing and alternating current erasing in regions each having a width of 30 μm on both sides of the track on which the signal was written. Here, the rate of a reduction in amplitude of the high frequency signal after the low frequency signal was overwritten with respect to the initial amplitude of the high frequency signal is called an amplitude reduction rate. In the evaluation method of the experiment, it was determined that the pole erase phenomenon occurred when the amplitude reduction rate was 10% or higher. A table below shows the result of evaluation of the occurrence of the pole erase phenomenon for the samples.

TABLE 6

| Samples | Amplitude reduction rate (%) | Occurrence of pole erase phenomenon |
| --- | --- | --- |
| Example 1 | 2 | No |
| Example 2 | 1 | No |
| Example 3 | 1 | No |
| Example 4 | 5 | No |
| Reference 1 | 26 | Yes |
| Reference 2 | 21 | Yes |
| Reference 3 | 40 | Yes |

As the experiment result shows, it is possible to suppress an occurrence of the pole erase phenomenon, according to the embodiment. In addition, the result shows that the value of Hk/(λ×σ) is preferably smaller than 0.2.

Figure 4:
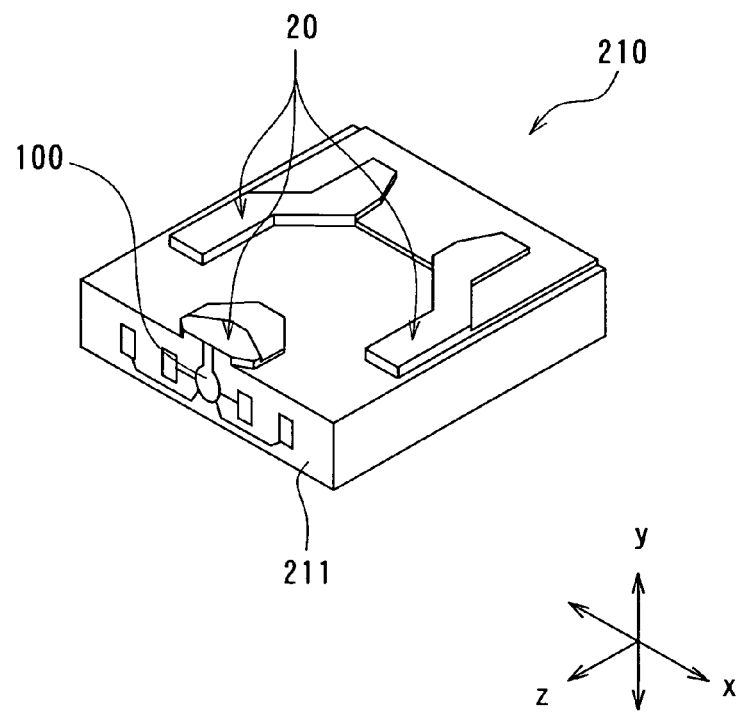
FIG. 4 is a perspective view illustrating a slider that a head gimbal assembly of the embodiment of the invention includes.

A head gimbal assembly, a head arm assembly and a magnetic disk drive of the embodiment will now be described. Reference is made to FIG. 4 to describe a slider 210 incorporated in the head gimbal assembly. In the magnetic disk drive, the slider 210 is placed to face toward a magnetic disk platter that is a recording medium to be rotated and driven. The slider 210 has a base body 211 made up mainly of the substrate 1 and the protection layer 17 of FIG. 1. The base body 211 is nearly hexahedron-shaped. One of the six surfaces of the base body 211 faces toward the magnetic disk platter. The air bearing surface 20 is formed in this one of the surfaces. When the magnetic disk platter rotates in the z direction of FIG. 4, an airflow passes between the magnetic disk platter and the slider 210, and a lift is thereby generated below the slider 210 in the y direction of FIG. 4 and exerted on the slider 210. The slider 210 flies over the magnetic disk platter by means of the lift. The x direction of FIG. 4 is across the tracks of the magnetic disk platter. A thin-film magnetic head 100 of the embodiment is formed near the air-outflow-side end (the end located at the lower left of FIG. 4) of the slider 210.

Figure 5:
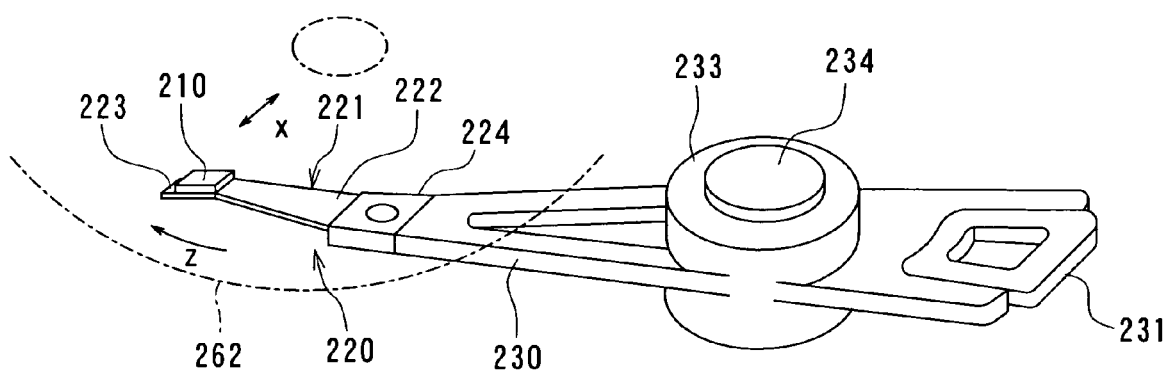
FIG. 5 is a perspective view illustrating a head arm assembly of the embodiment of the invention.

Reference is now made to FIG. 5 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly comprising the arm 230 and the head gimbal assembly 220 attached to the arm 230 is called a head arm assembly. An assembly comprising a carriage having a plurality of arms wherein the head gimbal assembly 220 is attached to each of the arms is called a head stack assembly.

FIG. 5 illustrates the head arm assembly of the embodiment. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 6:
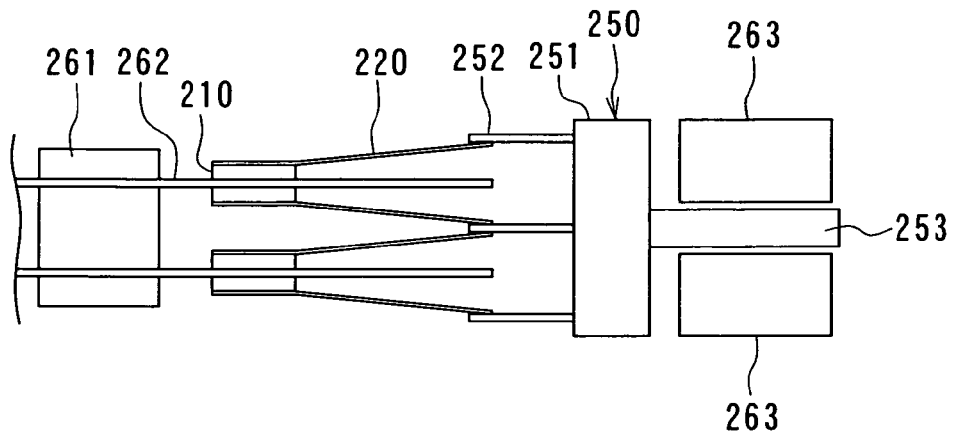
FIG. 6 is a view for illustrating a main part of a magnetic disk drive of the embodiment of the invention.
Figure 7:
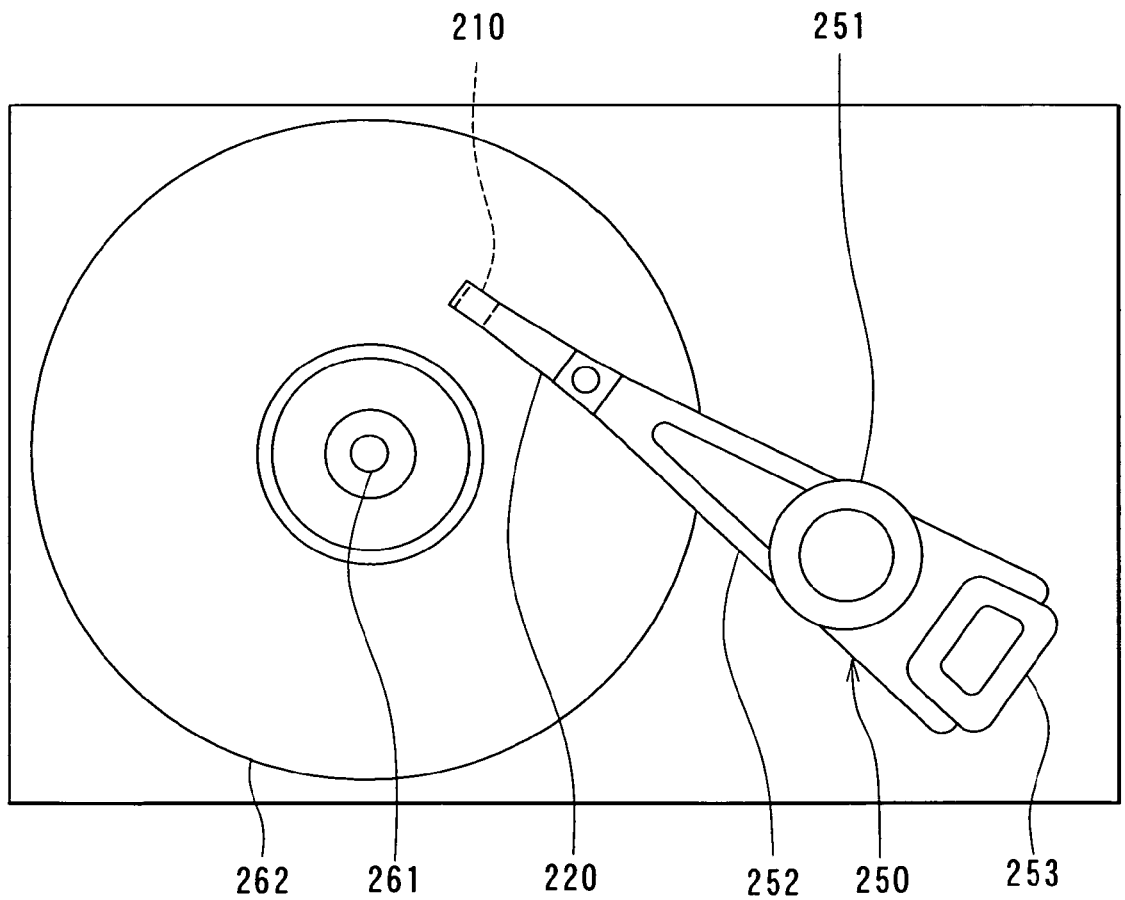
FIG. 7 is a top view of the magnetic disk drive of the embodiment of the invention.

Reference is now made to FIG. 6 and FIG. 7 to describe an example of the head stack assembly and the magnetic disk drive of the embodiment. FIG. 6 illustrates the main part of the magnetic disk drive. FIG. 7 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The magnetic head incorporated in the slider 210 writes data on the magnetic disk platter 262 through the use of the write head and reads data stored on the magnetic disk platter 262 through the use of the read head.

The head gimbal assembly, the head arm assembly and the magnetic disk drive of the embodiment exhibit effects similar to those of the foregoing magnetic head of the embodiment.

The present invention is not limited to the foregoing embodiment but may be practiced in still other ways. For example, in the embodiment, the magnetic head is disclosed, having such a configuration that the read head is formed on the base body and the write head is stacked on the read head. Alternatively, the read head may be stacked on the write head.

Obviously many modifications and variations of the present invention are possible in the light of the above teachings. It is therefore to be understood that within the scope of the appended claims the invention may be practiced otherwise than as specifically described.

What is claimed is:

1. A magnetic head for perpendicular magnetic recording comprising:
    a medium facing surface that faces toward a recording medium;

coil for generating a magnetic field corresponding to data to be written on the recording medium; and a pole layer having an end face located in the medium facing surface, allowing a magnetic flux corresponding to the field generated by the coil to pass therethrough, and generating a write magnetic field for writing the data on the recording medium through the use of a perpendicular magnetic recording system, wherein:

a material forming the pole layer is an alloy whose major elements are iron and nickel, and, where proportions of iron and nickel with respect to the total of iron and nickel are indicated as (100−M) weight % and M weight %, respectively, M is greater than 0 and smaller than or equal to 10; and an internal stress of the pole layer is a tensile stress; a magnetostriction constant of the material forming the pole layer is positive; where an anisotropy field of the pole layer is Hk (A/m), the magnetostriction constant of the material forming the pole layer is $\lambda(\times 10^{-6})$, and the internal stress of the pole layer is σ (MPa), a value of Hk/(λ×σ) is greater than 0.01 and smaller than 0.2, Hk is greater than 0 and smaller than or equal to 800, and σ is greater than or equal to 100 and smaller than or equal to 1000.

2. A magnetic head for perpendicular magnetic recording comprising:

a medium facing surface that faces toward a recording medium;

a coil for generating a magnetic field corresponding to data to be written on the recording medium; and a pole layer having an end face located in the medium facing surface, allowing a magnetic flux corresponding to the field generated by the coil to pass therethrough, and generating a write magnetic field for writing the data on the recording medium through the use of a perpendicular magnetic recording system, wherein:

a material forming the pole layer is an alloy whose major elements are iron and nickel, and, where proportions of iron and nickel with respect to the total of iron and nickel are indicated as (100−M) weight % and M weight %, respectively, M is greater than 0 and smaller than or equal to 10; and a coercivity of the pole layer in a direction of a hard axis is 400 A/m or smaller.

3. A magnetic head for perpendicular magnetic recording comprising:

a medium facing surface that faces toward a recording medium;

a coil for generating a magnetic field corresponding to data to be written on the recording medium; and a pole layer having an end face located in the medium facing surface, allowing a magnetic flux corresponding to the field generated by the coil to pass therethrough, and generating a write magnetic field for writing the data on the recording medium through the use of a perpendicular magnetic recording system, wherein:

a material forming the pole layer is an alloy whose major elements are iron and nickel, and, where proportions of iron and nickel with respect to the total of iron and nickel are indicated as (100−M) weight % and M weight %, respectively, M is greater than 0 and smaller than or equal to 10;

the pole layer incorporates: a track width defining portion having an end located in the medium facing surface; and a wide portion coupled to the other end of the track width defining portion and having a width greater than a width of the track width defining portion; and a magnetic domain wall is formed in the wide portion, the domain wall extending in a direction perpendicular to the medium facing surface and having an end located near the other end of the track width defining portion.

4. A head gimbal assembly comprising: a slider including a magnetic head for perpendicular magnetic recording and disposed to face toward a recording medium; and a suspension flexibly supporting the slider, wherein:

the magnetic head comprises:

a medium facing surface that faces toward the recording medium;

a coil for generating a magnetic field corresponding to data to be written on the recording medium; and a pole layer having an end face located in the medium facing surface, allowing a magnetic flux corresponding to the field generated by the coil to pass therethrough, and generating a write magnetic field for writing the data on the recording medium through the use of a perpendicular magnetic recording system, wherein:

a material forming the pole layer is an alloy whose major elements are iron and nickel, and, where proportions of iron and nickel with respect to the total of iron and nickel are indicated as (100−M) weight % and M weight %, respectively, M is greater than 0 and smaller than or equal to 10; and a coercivity of the pole layer in a direction of a hard axis is 400 A/m or smaller.

5. A head arm assembly comprising: a slider including a magnetic head for perpendicular magnetic recording and disposed to face toward a recording medium; a suspension flexibly supporting the slider; and an arm for making the slider travel across tracks of the recording medium, the suspension being attached to the arm, wherein:

the magnetic head comprises:

a medium facing surface that faces toward the recording medium;

a coil for generating a magnetic field corresponding to data to be written on the recording medium; and a pole layer having an end face located in the medium facing surface, allowing a magnetic flux corresponding to the field generated by the coil to pass therethrough, and generating a write magnetic field for writing the data on the recording medium through the use of a perpendicular magnetic recording system, wherein:

a material forming the pole layer is an alloy whose major elements are iron and nickel, and, where proportions of iron and nickel with respect to the total of iron and nickel are indicated as (100−M) weight % and M weight %, respectively, M is greater than 0 and smaller than or equal to 10; and a coercivity of the pole layer in a direction of a hard axis is 400 A/m or smaller.

6. A magnetic disk drive comprising: a slider including a magnetic head for perpendicular magnetic recording and disposed to face toward a recording medium that is rotated and driven; and an alignment device supporting the slider and aligning the slider with respect to the recording medium, wherein:

the magnetic head comprises:

a medium facing surface that faces toward the recording medium;

a coil for generating a magnetic field corresponding to data to be written on the recording medium; and a pole layer having an end face located in the medium facing surface, allowing a magnetic flux corresponding to the field generated by the coil to pass therethrough, and generating a write magnetic field for writing the data on the recording medium through the use of a perpendicular magnetic recording system, wherein:

a material forming the pole layer is an alloy whose major elements are iron and nickel, and, where proportions of iron and nickel with respect to the total of iron and nickel are indicated as (100−M) weight % and M weight %, respectively, M is greater than 0 and smaller than or equal to 10; and a coercivity of the pole layer in a direction of a hard axis is 400 A/m or smaller.

7. A head gimbal assembly comprising: a slider including a magnetic head for perpendicular magnetic recording and disposed to face toward a recording medium; and a suspension flexibly supporting the slider, wherein:

the magnetic head comprises:

a medium facing surface that faces toward the recording medium;

a coil for generating a magnetic field corresponding to data to be written on the recording medium; and a pole layer having an end face located in the medium facing surface, allowing a magnetic flux corresponding to the field generated by the coil to pass therethrough, and generating a write magnetic field for writing the data on the recording medium through the use of a perpendicular magnetic recording system, wherein:

a material forming the pole layer is an alloy whose major elements are iron and nickel, and, where proportions of iron and nickel with respect to the total of iron and nickel are indicated as (100−M) weight % and M weight %, respectively, M is greater than 0 and smaller than or equal to 10;

the pole layer incorporates: a track width defining portion having an end located in the medium facing surface; and a wide portion coupled to the other end of the track width defining portion and having a width greater than a width of the track width defining portion; and a magnetic domain wall is formed in the wide portion, the domain wall extending in a direction perpendicular to the medium facing surface and having an end located near the other end of the track width defining portion.

8. A head arm assembly comprising: a slider including a magnetic head for perpendicular magnetic recording and disposed to face toward a recording medium; a suspension flexibly supporting the slider; and an arm for making the slider travel across tracks of the recording medium, the suspension being attached to the arm, wherein:

the magnetic head comprises:

a medium facing surface that faces toward the recording medium;

a coil for generating a magnetic field corresponding to data to be written on the recording medium; and a pole layer having an end face located in the medium facing surface, allowing a magnetic flux corresponding to the field generated by the coil to pass therethrough, and generating a write magnetic field for writing the data on the recording medium through the use of a perpendicular magnetic recording system, wherein:

a material forming the pole layer is an alloy whose major elements are iron and nickel, and, where proportions of iron and nickel with respect to the total of iron and nickel are indicated as (100−M) weight % and M weight %, respectively, M is greater than 0 and smaller than or equal to 10;

the pole layer incorporates: a track width defining portion having an end located in the medium facing surface; and a wide portion coupled to the other end of the track width defining portion and having a width greater than a width of the track width defining portion; and a magnetic domain wall is formed in the wide portion, the domain wall extending in a direction perpendicular to the medium facing surface and having an end located near the other end of the track width defining portion.

9. A magnetic disk drive comprising: a slider including a magnetic head for perpendicular magnetic recording and disposed to face toward a recording medium that is rotated and driven; and an alignment device supporting the slider and aligning the slider with respect to the recording medium, wherein:

the magnetic head comprises:

a medium facing surface that faces toward the recording medium;

a coil for generating a magnetic field corresponding to data to be written on the recording medium; and a pole layer having an end face located in the medium facing surface, allowing a magnetic flux corresponding to the field generated by the coil to pass therethrough, and generating a write magnetic field for writing the data on the recording medium through the use of a perpendicular magnetic recording system, wherein:

a material forming the pole layer is an alloy whose major elements are iron and nickel, and, where proportions of iron and nickel with respect to the total of iron and nickel are indicated as (100−M) weight % and M weight %, respectively, M is greater than 0 and smaller than or equal to 10;

the pole layer incorporates: a track width defining portion having an end located in the medium facing surface; and a wide portion coupled to the other end of the track width defining portion and having a width greater than a width of the track width defining portion; and a magnetic domain wall is formed in the wide portion, the domain wall extending in a direction perpendicular to the medium facing surface and having an end located near the other end of the track width defining portion.

* * * * *